United States Patent [19]

Phillips

[11] Patent Number: 5,525,213
[45] Date of Patent: *Jun. 11, 1996

[54] SYSTEM FOR DECONTAMINATION DRY CLEANING WASTE WATER

[75] Inventor: Alan J. Phillips, Santa Monica, Calif.

[73] Assignee: Air Quality Corporation, Santa Monica, Calif.

[*] Notice: the term of this patent shall not extend beyond the expiration date of Pat. No. 5,223,126.

[21] Appl. No.: 264,778

[22] Filed: Jun. 23, 1994

[51] Int. Cl.⁶ .......................... B01D 17/12; B01D 21/30; B01D 36/04

[52] U.S. Cl. .......................... 210/86; 68/18 F; 202/176; 210/104; 210/167; 210/182; 210/258; 210/259

[58] Field of Search .......................... 68/18 C, 18 D, 68/18 F, 18 R, 12.08, 12.09; 210/86, 103, 104, 167, 182, 257.1, 258, 259, 513, 523, 799, 804, 806, 96.1, 85, 97, 101, 143, 175, 295, 314, 739, 744, 768, 774, 800; 8/141, 142, 158

[56] References Cited

U.S. PATENT DOCUMENTS

| | | | |
|---|---|---|---|
| 3,192,155 | 6/1965 | Bready et al. | 68/18 F |
| 3,692,467 | 9/1972 | Durr et al. | 68/18 F |
| 4,354,364 | 10/1982 | Holder et al. | 68/18 R |
| 4,513,590 | 4/1985 | Fine | 68/18 C |
| 4,637,232 | 1/1987 | Zucchini | 68/18 R |
| 4,664,754 | 5/1987 | Caputi et al. | 203/39 |
| 4,954,222 | 9/1990 | Durr et al. | 202/176 |
| 5,076,936 | 12/1991 | Metz | 210/662 |
| 5,090,221 | 2/1992 | Sewter et al. | 68/18 R |
| 5,223,126 | 6/1993 | Phillips | 210/86 |

FOREIGN PATENT DOCUMENTS 3912820  10/1990  Germany .............................. 210/259

*Primary Examiner*—Joseph W. Drodge
*Attorney, Agent, or Firm*—Poms, Smith, Lande & Rose

[57] ABSTRACT

A system for decontaminating waste water produced during dry cleaning operations which contains dry cleaning solvent and particulate contaminants. The system may preferably include a storage tank having an inlet through which waste water is introduced into the storage tank and a settling chamber having a bottom sediment zone; a particulate filter for removing substantially all of the particulate contaminants remaining in partially decontaminated waste water removed from the tank to provide particulate free waste water; a solvent filter for removing substantially all of the dry cleaning solvent remaining in the particulate free waste water to provide decontaminated waste water; a pump, located between the particulate filter and the solvent filter; an evaporator for evaporating the decontaminated waste water; and a recovery device for recovering the evaporated decontaminated water.

15 Claims, 2 Drawing Sheets

SYSTEM FOR DECONTAMINATION DRY CLEANING WASTE WATER

INTRODUCTION

The present invention relates generally to dry cleaning systems and, more particularly, to a system for decontaminating dry cleaning waste water.

BACKGROUND OF THE INVENTION

The present invention is related to the invention disclosed in U.S. Pat. No. 5,223,126, issued Jun. 29, 1993, the specification of which is incorporated by reference.

In the typical dry cleaning process, a small amount of dry cleaning waste water is formed, generally consisting of a mixture of water and a dry cleaning solvent. The waste water also contains solid particulate matter, such as dirt or lint, which is often suspended in the mixture. Perchloroethylene is the most common dry cleaning solvent in commercial use today.

Traditionally, this waste water mixture was merely disposed of. However, it has become increasingly important that the water and solvent be separated, both for economic and environmental reasons. By reclaiming the solvent from the waste water, the solvent can be re-used in the dry cleaning process, thereby reducing the operational cost of a dry cleaning establishment. Moreover, environmental considerations require that none of the solvent be released into the environment and often prohibit the release of waste water into sewer systems, even after the solvent has been removed.

A number of systems for reclaiming solvent from dry cleaning waste water have been proposed. For example, U.S. Pat. No. 4,637,232 to Zucchini discloses a distillation apparatus which separates the waste water solvent and water components. A distillation chamber vaporizes the azeotropic mixture of solvent and water, and produces a fluid which condenses to pure solvent that may be drawn away for use in the dry cleaning process. The Zucchini apparatus suffers from a number of shortcomings. First, the azeotropic mixture is highly corrosive due to the formation of hydrochloric (HCl) acid from the chloride solvent and water. Such acidity is especially damaging to metallic components of the apparatus. Although Zucchini attempts to control this by keeping the mixture predominantly solvent, even trace amounts of HCl can damage the distillation chamber and tank. Second, because solvent continues to remain in the mixture with water, the water cannot be safely disposed of. Third, even if all of the solvent was removed from the water, the Zucchini system would run afoul of regulations, so-called "sunset rules", which prohibit the release of previously contaminated water into the environment.

U.S. Pat. Nos. 4,513,590 to Fine and 4,354,364 to Holder et al. also disclose systems which can remove solvent from a waste water mixture. However, neither reference provides an apparatus which can purify the water from the waste water mixture.

The invention disclosed in U.S. Pat. No. 5,223,126 (the '126 system) solved many of the aforementioned problems associated with the Zucchini, Fine and Holder et al. systems by providing a system which removes essentially all of the solvent from the dry cleaning waste water mixture. However, the '126 system boiled the decontaminated waste water and vented the resulting steam into the atmosphere. As noted above, "sunset rules" may prohibit such venting.

Accordingly, a need exists for an apparatus which decontaminates the dry cleaning waste water mixture, resulting in pure solvent and pure water, both of which are recycled back into the dry cleaning system without exposing the environment to either.

SUMMARY OF THE INVENTION

Accordingly, a primary object of the present invention is to provide an apparatus which decontaminates dry cleaning waste water, resulting in both pure solvent and pure water, and which returns the pure solvent and pure water to the dry cleaning system without exposing the environment to either.

In order to accomplish these and other objectives, the present invention provides an improved system for decontaminating waste water produced during dry cleaning operations that contains dry cleaning solvent and particulate contaminants. In particular, a preferred embodiment of the present invention includes a storage tank including an inlet through which waste water is introduced and a settling chamber having a bottom sediment zone; a particulate filter for removing substantially all of the particulate contaminants remaining in partially decontaminated waste water removed from the tank to provide particulate free waste water; a solvent filter for removing substantially all of the dry cleaning solvent remaining in the particulate free waste water to provide decontaminated waste water; a pump, located between the particulate filter and the solvent filter; an evaporator for evaporating the decontaminated waste water; and a recovery device for recovering the evaporated decontaminated water.

Solvent that is removed from the waste water may be filtered by a screen and returned via pipes to the dry cleaning equipment's solvent storage tank. Similarly, the recovered decontaminated (and distilled) waste water may be returned to the dry cleaning equipment's steam boiler for re-use in the dry cleaning process. As such, the present invention significantly advances the state of the art by providing a waste water decontamination system which forms a "closed loop" with the dry cleaning equipment. Essentially all of the waste from the dry cleaning process is returned to the dry cleaning equipment, either in the form of pure solvent or pure water. That which is not returned, i.e. the solvent and particulates trapped by the filters, may be easily disposed of.

The above described and many other features and attendant advantages of the present invention will become apparent as the invention becomes better understood by reference to the following detailed description when considered in conjunction with the accompanying drawings.

DESCRIPTION OF THE DRAWINGS

Detailed descriptions of preferred embodiments of the invention will be made with reference to the accompanying drawings.

DETAILED DESCRIPTION OF A PREFERRED EXEMPLARY EMBODIMENT

The following is a detailed description of the best presently known mode of carrying out the invention. This description is not to be taken in a limiting sense, but is made merely for the purpose of illustrating the general principles of the invention. The scope of the invention is defined by the appended claims.

Figure 1:
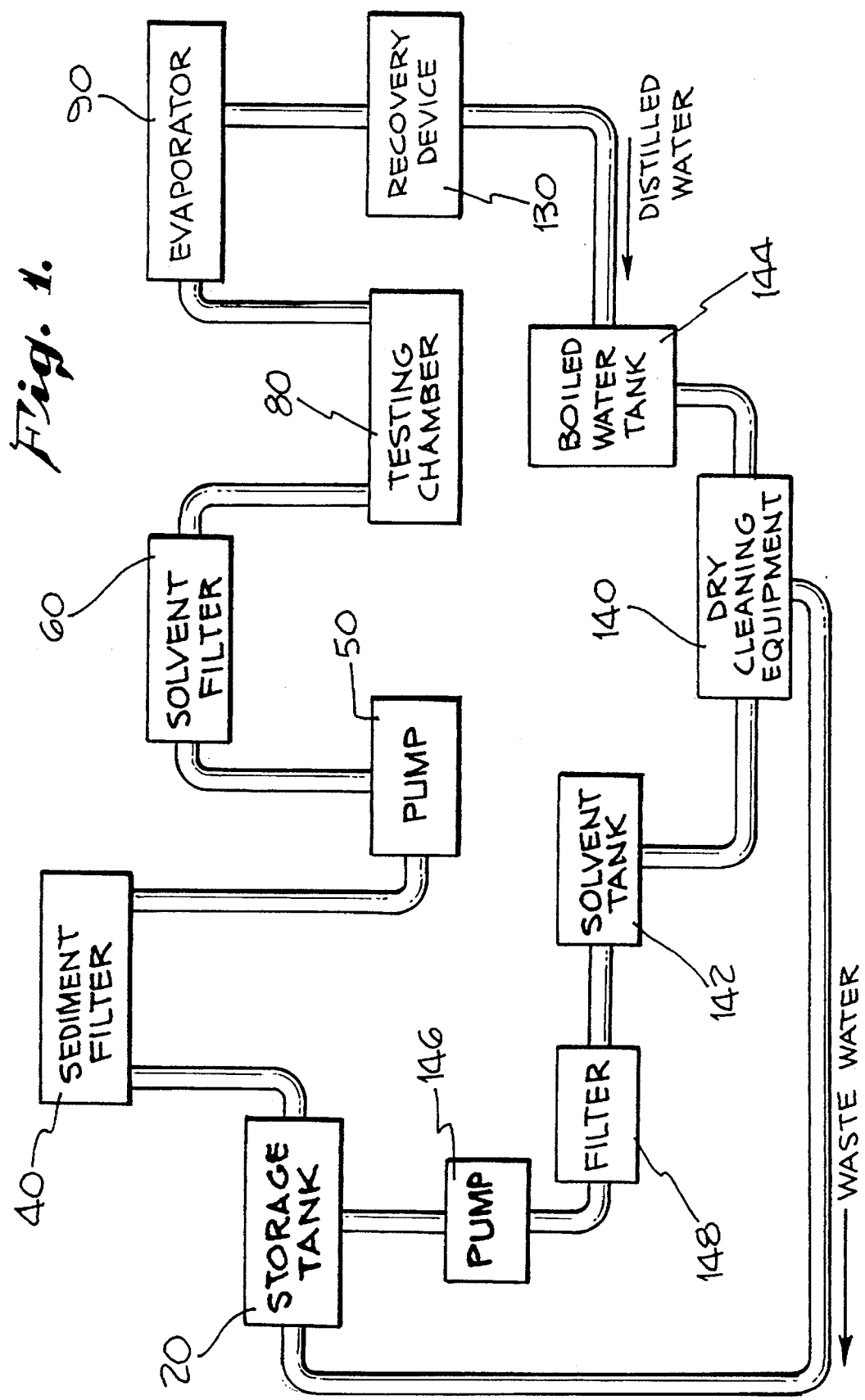
FIG. 1 shows a block diagram of a dry cleaning waste water decontamination system in accordance with a preferred embodiment of the present invention.

FIG. 1 illustrates a block diagram of a system for decontaminating dry cleaning waste water in accordance with the preferred embodiment of the present invention. Dry cleaning waste water from dry cleaning equipment 140 is introduced into a storage tank 20, in which the waste water is permitted to settle. Since the solvent is heavier than water, over a period of time a portion of the dry cleaning solvent settles to the bottom of the storage tank 20 due to gravity, with partially decontaminated waste water rising to the top. A pump 50 draws the partially decontaminated waste water from the top of the tank 20. The solvent which settles to the bottom of the storage tank 20 may be transferred by a pump 146 to a solvent tank 142 for re-use in the dry cleaning process. A screen 148 may be provided to remove any particulate contaminants which settle with the solvent.

Next, a particulate filter 40 removes all solid particulates from the waste water which exits the tank 20, producing particulate free waste water. The particulate free waste water then passes through a solvent filter 60, which removes all remaining dry cleaning solvent, yielding decontaminated waste water. A testing device 80 is provided for monitoring the level of dry cleaning solvent in the decontaminated waste water, to verify that all solvent has been removed by the solvent filter 60. An evaporator 90 evaporates the decontaminated waste water. The decontaminated waste water is heated to a boil, producing pure steam, which is then recovered and condensed by a recovery device 130, thereby producing distilled water. The distilled water is then fed into the boiler water tank 144 for re-use in the dry cleaning process.

While the preferred dry cleaning solvent is perchloroethylene, it is anticipated that the present system for decontaminating dry cleaning waste water may be utilized with any solvent commonly used in the dry cleaning industry.

Figure 2:
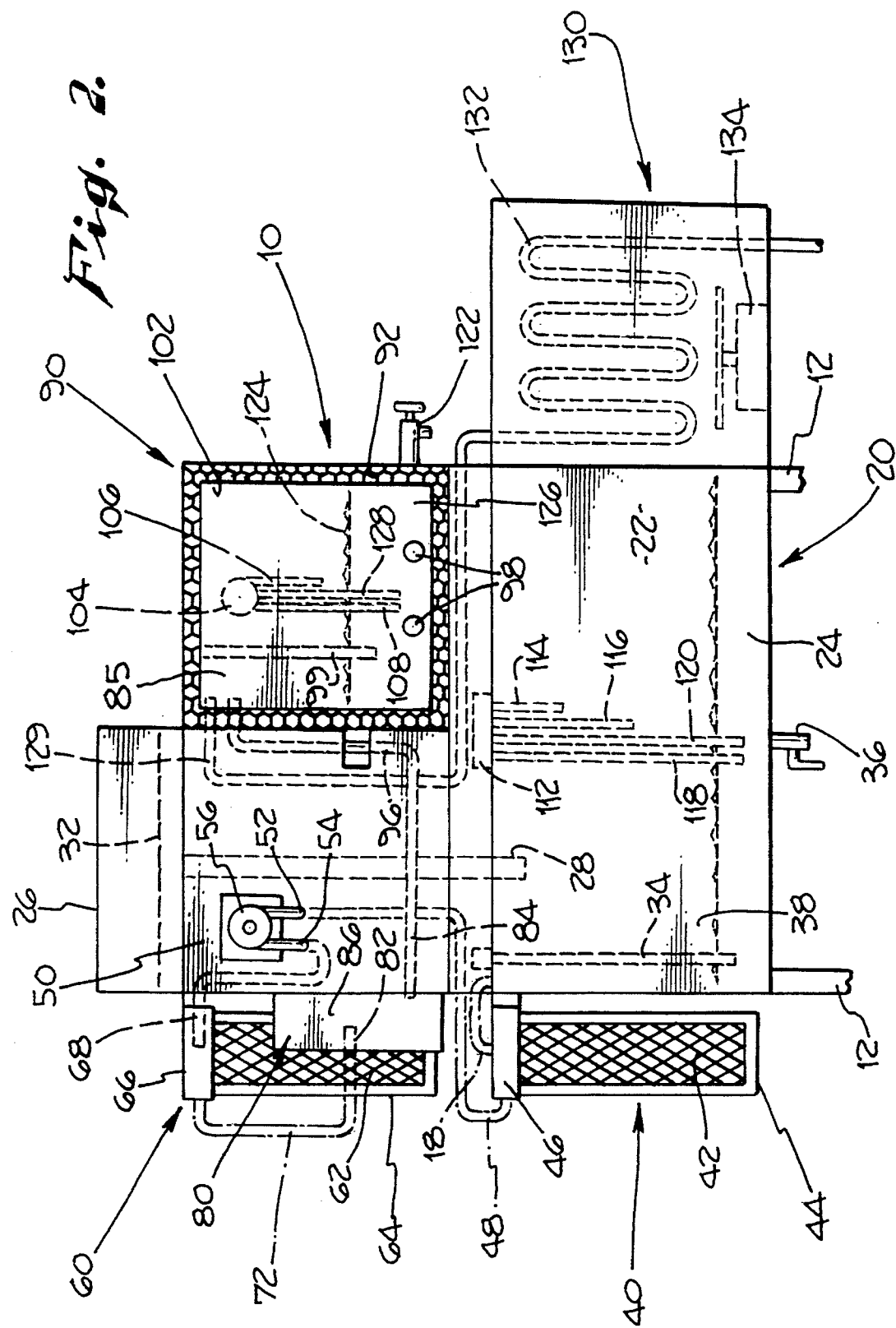
FIG. 2 shows a dry cleaning waste water decontamination apparatus in accordance with the preferred embodiment illustrated in FIG. 1.

FIG. 2 illustrates one example of an apparatus 10 for decontaminating dry cleaning waste water in accordance with the present invention. The apparatus includes a substantially self contained unit having a cabinet structure 12, which is supported by legs 14. The cabinet structure 12 may be constructed from stainless steel. Stainless steel is preferred, since it is easy to clean and manufacture. For ease of inspection and replacement, certain components can be mounted externally of the cabinet structure 12, in the manner illustrated for example in FIG. 2.

The lower portion of the cabinet structure 12 contains the storage tank 20. A funnel 26 is exposed at the upper portion of the structure 12, which is connected by a filler tube 28 to the tank 20. Waste water introduced into the funnel 26 flows through the tube 28 to fill the tank 20, where the waste water is stored for a period of time. In the preferred embodiment, the storage tank 20 has a capacity of 10.6 gallons. Inner walls 22 of the storage tank 20 define a settling chamber 38 having a bottom sediment zone 24.

Associated with the storage tank 20 is a pre-filter, which is provided for removing particulates prior to entry into storage tank 20. The pre-filter may be composed of a mesh screen 32 located in the funnel 26 above the filler tube 28. The exemplary mesh screen 32 is capable of removing particles having a size of about 100 mesh and greater. Waste water introduced into storage the tank 20 through the mesh screen 32 is allowed to settle by gravity, such that a portion of the dry cleaning solvent and particulate contaminants in the waste water form a sediment in the sediment zone 24. Simultaneously, partially decontaminated waste water containing reduced amounts of the dry cleaning solvent and particulate contaminants rise to the upper portion of the tank 20.

To remove the sediment from the sediment zone 24, an exhaust tube 34 is provided. Once the sediment has reached a maximum depth, the sediment can be pumped out from the storage tank through the exhaust tube 34. Particulate contaminants in the sediment may be screened out so that the sediment can be re-used in the dry cleaning process.

The particulate filter 40 removes substantially all of the particulates remaining in the partially decontaminated waste water to provide particulate free waste water. The particulate filter 40 may include a particulate filter element 42 which is capable of removing substantially all solid particulates from the partially decontaminated waste water. The filter element 42 is housed within a shell 44 having a top cover 46. Waste water from the storage tank 20 flows through a pipe 18, entering the particulate filter 40 through the top cover 46. In accordance with the preferred embodiment, the particulate filter element 42 is capable of removing particles having sizes greater than about 5 microns. As is well known in the industry, the filter element 42 is intended to be periodically inspected and replaced, by disengaging the shell 44 from the top cover 46. Particulate free waste water exits the particulate filter 40 through a pipe 48.

Downstream from the particulate filter 40 is the pump 50, which provides pressure for removing the partially decontaminated waste water from the settling chamber 38 through the particulate filter 40. The pump 50 is composed of a pump chamber 56, an intake pipe 52 and an exhaust pipe 54. The exemplary pump chamber 56 is powered by 120 volts AC, and has a flow rate of approximately 4.75 gallons per hour. The particulate free waste water flowing out of the particulate filter 40 via the pipe 48 enters the pump 50 through the intake pipe 52. Then, the particulate free waste water is pushed past the pump 50 through the exhaust pipe 54.

The solvent filter 60 removes substantially all of the dry cleaning organic solvent remaining in the particulate free waste water to provide decontaminated waste water. The solvent filter includes a solvent filter element 62 which is capable of removing substantially all organic solvents from the particulate free waste water. The filter element 62 is housed within a shell 64 having a top cover 66. Particulate free waste water from the pump 50 flows through a pipe 68, entering the solvent filter 60 through the top cover 66. In accordance with the preferred embodiment, the solvent filter element 62 is formed of activated charcoal, and is capable of removing substantially all organic solvents, such as perchloroethylene, from the particulate free waste water. As is well known in the industry, the filter element 62 is intended to be periodically inspected and replaced, by disengaging the shell 64 from the top cover 66. Decontaminated waste water exits the solvent filter 40 through a pipe 72.

To insure that the solvent filter 60 is operating properly, the testing device 80 monitors the level of dry cleaning solvent in the decontaminated waste water. The testing device may include a testing chamber 86 connected between the solvent filter 60 and the evaporator 90, and is capable of identifying any remaining dry cleaning solvent in the decontaminated waste water. The decontaminated waste water from the pipe 72 enters the testing chamber 86 through an intake pipe 82, where it is tested. The decontaminated waste water then exits through an exhaust pipe 84. As will be further described below, the testing device 80 is electrically connected to the pump 50, to stop the flow of waste water through the system if any solvent is discovered in the decontaminated waste water.

The evaporator 90 evaporates the decontaminated waste water. The evaporator 90 includes an evaporation tank 85 having internal walls 102 surrounding an internal evaporating chamber 124. The walls 102 are filled with an insulating material 92. A heating element 98 is disposed within the evaporating chamber 124 adjacent to a bottom portion 126. Decontaminated waste water from testing device 80 enters the evaporating chamber 124 through a pipe 96. The exemplary heating element 98 is capable of slowly boiling the decontaminated waste water which is introduced into the evaporating chamber 124, thereby producing steam. A sacrificial anode 99 is also provided. The sacrificial anode is preferably an aluminum alloy 8020 cathodic protection device manufactured by Vanode Company, located at 236 North Sunset Avenue, City of industry, Calif. 91744. It should be clear that the corrosion problem faced by distillation systems disclosed in the prior art is avoided, since only water is being evaporated and not an azeotropic mixture.

The steam is then transferred through a pipe 129 into the recovery device 130, in which the steam is condensed. In the illustrated embodiment, the recovery device includes a coil 132 and a cooling fan 134. After, condensation, the now distilled water is transferred to the boiler tank 144 for re-use.

To aid in cleaning the above described system, a storage tank clean out valve 36 and an evaporator clean out valve 122 may be provided. The valves 36 and 122 allow the operator to periodically clean the storage tank 20 and the evaporator tank 85, respectively, to remove unwanted residue which would otherwise reduce the effectiveness of the system.

Monitoring of the operation of the preferred embodiment is performed by a plurality of sensors. First, a storage tank sensor 112 is provided, having a solvent element 118, a high water element 114, a low water element 116 and a ground element 120. The solvent element 118 and ground element 120 extend downward into the sediment zone 24, and are of the same length. The ground element 120 forms a conductive path with each of the high water element 114, low water element 116 and solvent element 118 when the elements are immersed in water. The solvent acts as an insulator to break the conductive path between the solvent element 118 and the low water element 116. The solvent element 118 is electrically connected to the pump 50 to disengage the pump once the sediment reaches a predetermined maximum depth and the conductive path between the solvent element 118 and the ground element 120 is broken. In the preferred sediment zone, the maximum depth corresponds to a capacity of approximately 1.5 gallons of solvent. Before the pump 50 can be started, the operator must pump the sediment from the sediment zone 24 through the exhaust pipe 34.

The low water element 116 is electrically connected in series with the solvent element 118 and the ground element 120, and to the pump 50. The pump 50 cannot be started unless all three elements are covered with waste water, and the sediment has been removed from the sediment zone 24. Once the waste water level drops below the low water element 116, indicating a minimum depth of waste water, the pump 50 is disengaged, and the operator is alerted that additional waste water can be added to the system. The high water element 114 indicates that the tank 20 has reached a maximum depth of waste water. When the waste water reaches this maximum depth, an electrical connection is formed between the ground element 120 and the high water element 114, and an alarm sounds to alert the operator to preclude additional waste water from being added.

Similarly, the depth of decontaminated waste water in the evaporation tank 85 is controlled by an evaporator sensor 104, having upper an element 106, a lower element 108, and a ground element 128. The evaporator sensor 104 is disposed within the evaporating chamber 124, and is capable of shutting off the heating element 98 and the pump 50 dependent on the level of decontaminated waste water in the evaporating chamber 124. The lower element 108 and the ground element 128 are the same length. The upper element 106 of the sensor 104 forms an electrical connection with the ground element 128 when both elements are immersed in water. The pump 50 is disengaged when the level of decontaminated waste water reaches the upper element 106, indicating a predetermined maximum depth. The lower element 108 also forms an electrical connection with the ground element 128 when immersed in the decontaminated waste water. Breaking of this connection serves as an indication that a predetermined minimum depth has been reached. Once the decontaminated waste water reaches the predetermined minimum depth, the heater element 98 disengages.

In accordance with the preferred embodiment, an electronic control circuit may be provided to control and monitor operation of the system elements. The electronic control circuit is electrically connected to the testing device 80, storage tank sensor 112 and evaporator sensor 104, to receive the maximum and minimum depth signals described above. Also, the testing chamber 86 produces an emergency signal to disengage the pump 50 upon discovery of any solvent downstream from the solvent filter 60. The electronic control circuit energizes the pump 50 and heating element 98 in accordance with these signals. The electronic control circuit may also provide both audible means and visual means of alerting the operator upon receipt of signals from either the storage tank sensor 112 or the evaporator sensor 104. The audible means may be a horn or a siren. The visual means may be lights or light emitting diodes (LEDs).

Although the present invention has been described in terms of the preferred embodiments above, numerous modifications and/or additions to the above-described preferred embodiments would be readily apparent to one skilled in the art. It is intended that the scope of the present invention extends to all such modifications and/or additions and that the scope of the present invention is limited solely by the claims set forth below.

What is claimed is:

1. A system adapted for decontaminating waste water produced during dry cleaning operations containing dry cleaning solvent and particulate contaminants, said system comprising:

a storage tank including an inlet through which said waste water is introduced into said storage tank and walls defining a settling chamber having a bottom sediment zone, at least a portion of said dry cleaning solvent and particulate contaminants in said waste water settling by gravity to form a sediment in said sediment zone and to provide partially decontaminated waste water which contains reduced amounts of said dry cleaning solvent and particulate contaminants;

particulate filter means for removing substantially all of the particulate contaminants remaining in said partially decontaminated waste water to provide particulate free waste water;

solvent filter means for removing substantially all of the dry cleaning solvent remaining in said particulate free waste water to provide decontaminated waste water;

a peristaltic pump, located between said particulate filter means and said solvent filter means, for removing said partially decontaminated waste water from said settling chamber;

evaporator means for evaporating said decontaminated waste water; and recovery means for recovering said evaporated decontaminated water.

2. A system for decontaminating waste water according to claim 1 wherein the recovery means comprises a condenser.

3. A system adapted for decontaminating waste water produced during dry cleaning operations containing dry cleaning solvent and particulate contaminants, said system comprising:

a storage tank including an inlet through which said waste water is introduced into said storage tank and walls defining a settling chamber having a bottom sediment zone, at least a portion of said dry cleaning solvent and particulate contaminants in said waste water settling by gravity to form a sediment in said sediment zone and to provide partially decontaminated waste water which contains reduced amounts of said dry cleaning solvent and particulate contaminants;

pump means for removing said partially decontaminated waste water from said settling chamber;

particulate filter means for removing substantially all the particulate contaminants remaining in said partially decontaminated waste water to provide particulate free waste water;

solvent filter means for removing substantially all the dry cleaning solvent remaining in said particulate free waste water to provide decontaminated waste water; and an evaporator including an evaporation tank having insulated walls surrounding an internal evaporating chamber and a heating element disposed within said evaporating chamber at a bottom portion thereof, said heating element capable of boiling said decontaminated waste water which is introduced into said evaporating chamber, thereby producing steam;

recovery means for recovering said steam;

a testing device including a testing chamber located between said solvent filter means and said evaporator, said testing chamber capable of identifying any remaining dry cleaning solvent in said decontaminated waste water; and a termination device having a logic circuit capable of stopping said pump means and said evaporator if said dry cleaning solvent is identified by said testing means.

4. A system for decontaminating waste water according to claim 3 wherein the recovery means comprises a condenser.

5. A system adapted for decontaminating waste water produced during dry cleaning operations containing dry cleaning solvent and particulate contaminants, said system comprising:

a storage tank including an inlet through which said waste water is introduced into said storage tank and walls defining a settling chamber having a bottom sediment zone, at least a portion of said dry cleaning solvent and particulate contaminants in said waste water settling by gravity to form a sediment in said sediment zone and provide partially decontaminated waste water which contains reduced amounts of said dry cleaning solvent and particulate contaminants;

pump means for removing said partially decontaminated waste water from said settling chamber;

particulate filter means for removing substantially all the particulate contaminants remaining in said partially decontaminated waste water to provide particulate free waste water;

solvent filter means for removing substantially all the dry cleaning solvent remaining in said particulate free waste water to provide decontaminated waste water;

evaporator means for evaporating said decontaminated waste water;

means for removing said sediment from said sediment zone;

recovery means for recovering said evaporated decontaminated water; and storage tank sensor means for sensing the level of said waste water in said storage tank and, in response, controlling said pump means.

6. A system for decontaminating waste water according to claim 5 wherein said storage tank sensor means comprises means for detecting the presence of a predetermined maximum amount of sediment in said sediment zone, and for disengaging said pump means upon said sediment reaching said predetermined maximum amount.

7. A system for decontaminating waste water according to claim 5 wherein said storage tank sensor means comprises means for detecting the presence of a maximum amount of waste water in said storage tank, and for alerting an operator upon said waste water reaching said predetermined maximum amount.

8. A system for decontaminating waste water according to claim 5 wherein said storage tank sensor means comprises means for detecting the presence of a predetermined minimum amount of said waste water in said storage tank, and for disengaging said pump means upon said waste water dropping below said predetermined minimum amount.

9. A system for decontaminating waste water according to claim 5 wherein the recovery means comprises a condenser.

10. A system adapted for decontaminating waste water produced during dry cleaning operations containing dry cleaning solvent and particulate contaminants, said system comprising:

a storage tank including an inlet through which said waste water is introduced into said storage tank and walls defining a settling chamber having a bottom sediment zone, at least a portion of said dry cleaning solvent and particulate contaminants in said waste water settling by gravity to form a sediment in said sediment zone and to provide partially decontaminated waste water which contains reduced amounts of said dry cleaning solvent and particulate contaminants;

pump means for removing said partially decontaminated waste water from said settling chamber;

particulate filter means for removing substantially all of the particulate contaminants remaining in said partially decontaminated waste water to provide particulate free waste water;

solvent filter means for removing substantially all the dry cleaning solvent remaining in said particulate free waste water to provide decontaminated waste water;

an evaporator including an evaporation tank having insulated walls surrounding an internal evaporating chamber and a heating element disposed within said evaporating chamber at a bottom portion thereof, said heating element capable of boiling said decontaminated waste water which is introduced into said evaporating chamber, thereby producing steam;

recovery means for recovering said steam; and evaporator sensor means for sensing the level of said decontaminated waste water in said evaporation tank and, in response, controlling said pump means.

11. A system for decontaminating waste water according to claim 10 wherein said evaporator sensor means comprises means for detecting the presence of a predetermined maximum depth of said decontaminated waste water in said evaporating tank, and for disengaging said pump means upon said decontaminated waste water reaching said predetermined maximum depth.

12. A system for decontaminating waste water according to claim 10 wherein said evaporator sensor means comprises means for detecting the presence of a predetermined minimum depth of said decontaminated waste water in said evaporating tank, and for disengaging said heating element upon said decontaminated waste water dropping below said predetermined minimum depth.

13. A dry cleaning system, comprising:

a dry cleaning device including a solvent tank and a boiler water tank, the dry cleaning device emitting waste water including dry cleaning solvent and particulate contaminants;

a storage tank operably connected to, and receiving waste water from, the dry cleaning device, the storage tank defining a settling chamber having a bottom sediment zone in which at least a portion of the dry cleaning solvent and particulate contaminants in the waste water settle by gravity to form a sediment, thereby providing partially decontaminated waste water having reduced amounts of the dry cleaning solvent and particulate contaminants, the partially decontaminated waste water being located in a partially decontaminated waste water area above the bottom sediment zone;

a particulate filter operably connected to the partially decontaminated waste water area and adapted to remove substantially all of the particulate contaminants remaining in the partially decontaminated waste water, thereby providing particulate free waste water;

a solvent filter operably connected to the particulate filter and adapted to remove substantially all of the solvent remaining in the particulate free waste water, thereby providing solvent and particulate free waste water, the solvent and particulate free waste water defining decontaminated waste water;

a pump operably connected to the particulate filter, the solvent filter and the settling chamber;

an evaporator adapted to evaporate the decontaminated waste water; and a recovery device operably connected to the evaporator and to the boiler water tank, the recovery device condensing the evaporated decontaminated water, thereby producing distilled water and returning the distilled water to the boiler water tank.

14. A dry cleaning system as claimed in Claim 13, further comprising a pump and a screen arranged between the sediment zone and the dry cleaning device solvent tank for supplying contaminant free solvent to the solvent tank.

15. A dry cleaning system, comprising:

a dry cleaning device including a solvent tank and a boiler water tank, the dry cleaning device emitting waste water including dry cleaning solvent and particulate contaminants;

separation means, including a bottom sediment zone and a partially decontaminated waste water area above the bottom sediment zone, and being operably connected to and receiving waste water from the dry cleaning device, for separating the waste water into a sediment located in the bottom sediment zone and partially decontaminated waste water located in the partially decontaminated waste water area, the sediment including at least a portion of the dry cleaning solvent and particulate contaminants in the waste water and the partially decontaminated waste water having reduced amounts of the dry cleaning solvent and particulate contaminants;

filter means, operably connected to the partially decontaminated waste water area, for removing the dry cleaning solvent and particulate contaminants from the partially decontaminated waste water, thereby providing decontaminated waste water; and distilling means, operably connected to the filter means and the boiler water tank, for distilling the decontaminated waste water and returning the distilled water to the boiler water tank.

\* \* \* \* \*